…

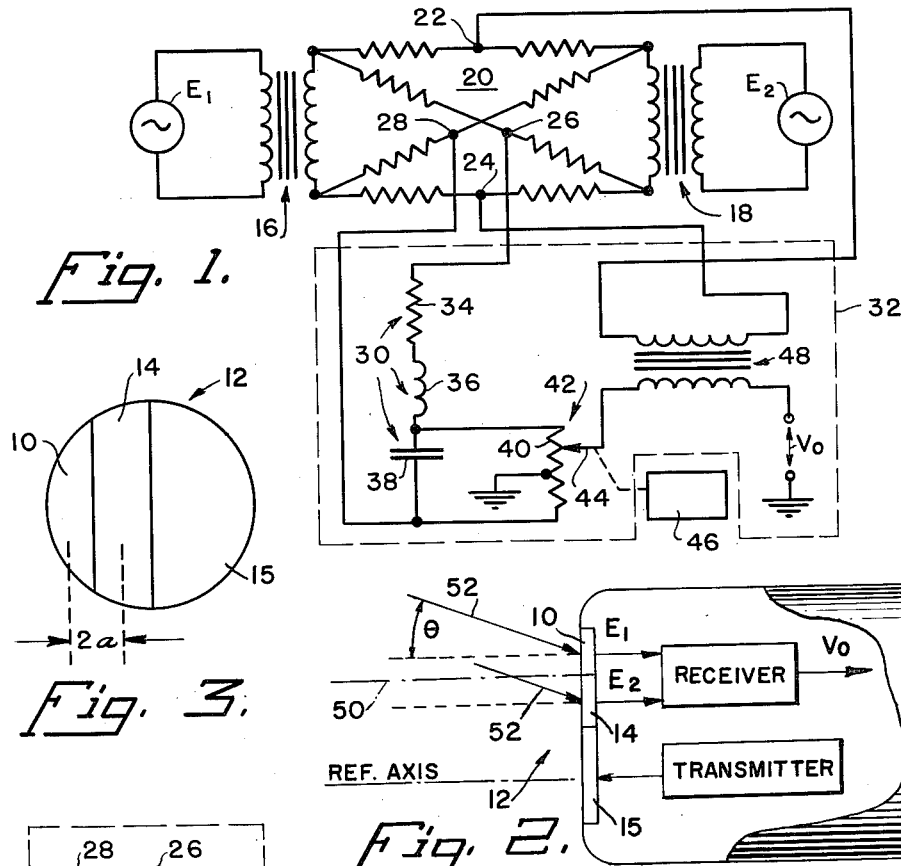
Fig. 1.
Fig. 3.
Fig. 2.
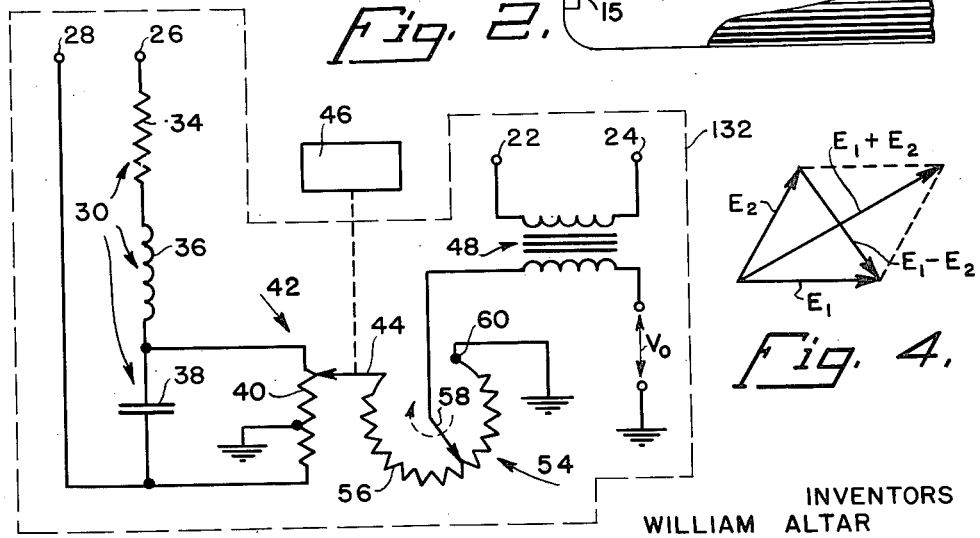
Fig. 4.
Fig. 5.
INVENTORS
WILLIAM ALTAR
CARL W. HELSTROM
BY
ATTORNEYS

United States Patent Office 3,048,813
Patented Aug. 7, 1962

3,048,813
ACOUSTIC HOMING TORPEDO SCANNING SYSTEM
William Altar and Carl W. Helstrom, Pittsburgh, Pa., assignors, by mesne assignments, to the United States of America as represented by the Secretary of the Navy
Filed Feb. 11, 1955, Ser. No. 487,722
7 Claims. (Cl. 340—3)

This invention relates to underwater object locating systems and in particular to means for reducing transit time misalignment between transmitting and receiving transducers.

Acoustic underwater object locating systems are used by surface vessels to search for and locate underwater objects, such as submarines, and by submarines to search for and locate surface vessels and other submarines. Such systems can also be used to guide torpedoes toward a target.

In many underwater object locating systems the same transducer is used to transmit and receive acoustic energy, and the axes of the transmitting and receiving sensitivity patterns of the transducer therefore normally coincide. In some such systems, separate receiving and transmitting transducers are employed and of necessity are so mounted in adjacent relationship that again the axes of their sensitivity patterns substantially coincide. If the transmitting and receiving transducers are being turned at an angular velocity $\Omega$, misalignment of the receiving sensitivity pattern and the target direction will occur whenever the transit time $\tau$ of the outgoing and returning signal becomes comparable with the illumination time $I$ of the target; that is, by the time the echo from the target returns, the receiving transducer will have turned through an angle $\Omega\tau$, and if this angle is greater than one half the beam width of the sensitivity pattern of the receiving transducer, where the beam width is defined as the angular separation between the half power points, the response of the receiving transducer to the echo will be seriously impaired. In a typical example, the speed of sound in water is approximately 5000 feet per second, the angular velocity $\Omega$ is 7° per second, and the beam width is 14°. Misalignment becomes observable with a target at a range of 400 yards, and for targets at ranges of 1000 yards or more, the decrease in the magnitude of the echo from the target together with the decrease in sensitivity of the receiver transducer due to misalignment can cause the echo from the target to be missed completely. Misalignment thus discriminates against echoes from targets at long ranges but does not affect reverberation, the reflection of transmitted acoustic energy from the myriads of discontinuities found substantially immobile in the sea, since reverberation is originated primarily by discontinuities which are at close range to the transmitting transducer.

It is, therefore, an object of this invention to reduce, in an underwater object locating device, the effect of transit time misalignment between the transmitting transducer and the receiving transducer.

It is a further object of this invention to in effect shift or tilt the sensitivity pattern of the receiving transducer in a sense opposite to that of the angular velocity of the transmitting and receiving transducers.

It is a still further object of this invention to in effect shift or tilt the sensitivity pattern of the receiving transducer in a direction opposite to that of the angular velocity of the transducer and by an angle substantially equal to the angular velocity of the transducer times the transit time of sound energy to the target and back.

It is still another object of this invention to in effect shift or tilt the sensitivity pattern of the receiving transducer by electrical means in such manner that transit time misalignment between the transmitting and receiving transducers is substantially compensated.

Other objects and many of the attendant advantages of this invention will be readily appreciated as the same become better understood with reference to the following detailed description when considered in connection with the accompanying drawing wherein:

FIG. 1 is a schematic diagram of the invention for use with an active-acoustic underwater object locating system operating in a C.W. (continuous wave) mode.

FIG. 2 illustrates diagrammatically the forward portion of an active-acoustic homing torpedo including a multisegment transducer shown in plan view, and depicts reflected acoustic energy impinging upon the receiving segments of the transducer, FIG. 3 is a schematic face view of the multisegment transducer, FIG. 4 is a diagram for illustrating addition and subtraction of voltage vectors, and FIG. 5 is a schematic diagram of a modification of the misalignment compensator for use in a pulsed active acoustic underwater object locating system.

The invention is here described with reference to that part of an active-acoustic underwater target location system which is arranged and utilized for detection of target direction in azimuth. For such purpose the system employs a suitably segmented transducer which, in the case of a torpedo embodiment, turns with the torpedo in azimuth in a direction and at an angular rate dependent upon rudder position as controlled in accordance with torpedo search and attack characteristics. Referring to FIGS. 1, 2 and 3, echo voltage $E_1$ is produced by segment 10 of a conventional multisegment magnetostrictive transducer 12, and echo voltage $E_2$ is produced by segment 14, in response to acoustic energy impinging upon these receiving segments and arising, in the illustrated embodiment, by target reflection of acoustic energy projected from transmitting segment 15 along a normal reference axis as indicated in FIG. 2. The detection pattern of the receiving segments is to be understood as conventionally directional and extending along an acoustic axis adjacent and parallel to the reference axis. The voltages $E_1$ and $E_2$ will differ in phase, in accordance with the angle $\theta$ at which reflected acoustic energy arrives at the transducer as illustrated in FIG. 2, and to an extent also determined by the operating frequency and the physical spacing $2a$ between effective centers of the receiving segments 10 and 14. While the magnitude of these echo voltages $E_1$ and $E_2$ is dependent upon equipment characteristics, and also variable in accordance with such factors as target range and the direction angle $\theta$, voltages $E_1$ and $E_2$ will of course always be substantially alike in magnitude since the segments are essentially duplicates and the reception angle $\theta$ is the same for both. Voltages $E_1$ and $E_2$ are applied through transformers 16, 18 to a form of a bearing deviation indicator network 20 which comprises 8 equal resistors connected as indicated. The resultant voltage between terminals 22, 24 of network 20 is proportional to the vector sum of $E_1$ and $E_2$ and the resultant voltage between terminals 26, 28 of network 20 is proportional to the vector difference of $E_1$ and $E_2$. FIG. 4 illustrates the vector addition and subtraction of voltages $E_1$ and $E_2$, the resultant sum and difference voltages being in quadrature as shown. Since the proportionality factor is simply a matter of engineering design and otherwise of no importance to an understanding of the present invention, and may in fact be taken as unity for the purpose of simplifying further description, the resultant voltages delivered by network 20 and other like voltages are hereinafter identified simply as $E_1+E_2$ or $E_1-E_2$ as the case may be. The difference voltage $E_1-E_2$ is applied across RLC series circuit 30 of misalignment compensator 32. Circuit 30 consists of resistor 34, inductor 36 and capacitor 38. The values of the components of circuit 30 are chosen so that the circuit is resonant at the frequencies of $E_1$ and $E_2$. As a result, the voltage across capacitor 38 is shifted 90° with respect to the vector difference voltage $E_1-E_2$, as later expressed by the quadrature operator $j$ in Equation 1, so that it is then either in phase or in phase opposition with $E_1+E_2$, depending upon the angular velocity direction. The voltage across capacitor 38 is applied across the resistor 40 of potentiometer 42. The center tap of resistor 40 is grounded. Arm 44 of potentiometer 42 is adapted to be positioned mechanically, by conventional means 46 which are schematically illustrated, so that its position is a linear function of the direction and magnitude of the angular velocity at which the transducer 12 is being turned. If the object locating system is to be mounted in a torpedo, the arm 44 could be mechanically linked to the azimuth steering system of the torpedo. The voltage picked off by arm 44 is added to the sum voltage $E_1+E_2$ by means of transformer 48, in such manner that the magnitude of the resultant voltage $V_0$ is made greater than the sum voltage $E_1+E_2$, in effect reducing the loss in target signal strength ordinarily imposed by inherent transit time misalignment. The output voltage $V_0$, which may be employed for detection or recognition of target presence, and for switching torpedo operation from a search phase to a pursuit phase in conventional manner and by means not forming a part of the present invention, is then defined by the equation $$V_0 = E_1 + E_2 + jf(E_1 - E_2) \quad (1)$$

where $j$ is the quadrature operator, and where $f$ is a fraction, the magnitude and sign of which depends upon the position of arm 44 of potentiometer 42 and, therefore, upon the magnitude and sense of the angular velocity of the transducer 12.

The effective sensitivity pattern of the receiving transducer, as produced by combining voltages therefrom in accordance with Equation 1 above, has a lobe shifted or tilted to the right, or left, of the normal acoustic axis 50 of transducer 12 by an angle which is determined by the fraction $f$. The value of $f$ varies in such manner that the axis of the sensitivity pattern of the receiver transducer 12 follows or trails the beam of transmitting transducer by a substantially fixed amount, the sign of $f$ being automatically changed when the direction of the angular velocity is reversed. While such provision of a predetermined and fixed following angle for the receiving transducer, in a sonar or torpedo system operating in a C.W. mode as in this first described embodiment, provides transit time misalignment compensation which is exact at only one preselected range, say at maximum range at which signal increase is most desirable, the improvement also extends in a degree to other ranges.

In order to prove that the effective sensitivity pattern of receiver transducer 12 has the desired trailing characteristics, assume that the distance between the effective centers of segments 10, 14, taken on a horizontal line, is the distance $2a$, as in FIG. 2. Let $k=2\pi/\lambda$ where $\lambda$ is the wave length of the acoustic radiation, and let $\theta$ be the angle between axis 50 of transducer 12 and the direction 52 from which comes radiation reflected from a target. Then the sum voltage is defined by $$E_1 + E_2 = 2E_0 \cos(ka \sin \theta) \cos \omega t \quad (2)$$

and the difference voltage is defined by $$E_1 - E_2 = 2E_0 \sin(ka \sin \theta) \sin \omega t \quad (3)$$

where $E_0$ represents the like magnitudes of $E_1$ and $E_2$ and of the phase reference voltage that would be generated by the incident acoustic energy at an equivalent transducer located between segments 10 and 14, and where $\omega$ is the angular frequency of the incident acoustic energy. From Equation 2 it can be seen that the sum voltage has a maximum in the forward direction, its pattern being that which would exist if the receiver transducer has not been split. From Equation 3 it is seen that the difference voltage has a pattern consisting of two lobes on either side of axis 50 with maxima at the angle $\theta_1$ defined by $$\theta_1 = \pm \sin^{-1} \pi/2ka \quad (4)$$

The phases are opposite in the two lobes. Substituting Equations 2 and 3 in Equation 1, and substituting for $f$ an equal factor $\tan \delta$, expressed as $\sin \delta/\cos \delta$, then Equation 1 can be simplified and written as $$V_0 \propto 2E_0 \cos(ka \sin \theta - \delta) \cos \omega t \quad (5)$$

Equation 5 has a maximum in the direction $$\theta_0 = \sin^{-1}\left(\frac{\delta}{ka}\right) \quad (6)$$

The fraction $f$ is chosen so that $\theta_0$ is roughly equal to $\Omega\tau$, where $\tau$ is the transit time associated with a target at the maximum expected range. In a C.W. active acoustic object locating system, the amount that arm 44 of potentiometer 42 moves for a given angular velocity is arbitrarily determined to facilitate search for targets which are at long ranges. After the echo from a target has been identified as such and after the distance to the target has been reduced, the amount of tilt of the sensitivity pattern of the receiving transducer for a given angular velocity can be reduced or eliminated, if desired, by conventional means which are not illustrated.

In FIG. 5 the misalignment compensator 132 has been adapted for use with a pulsed object locating system. In a pulsed system, the transit time $\tau$ of an echo is the time elapsed since the instant $t_0$ when the last pulse of acoustic energy was transmitted. Knowing this, the angle of tilt $\theta$ can be varied linearly to compensate accurately for targets at any range. This variation is produced by adding a second potentiometer 54. The arm 44 of potentiometer 42 is moved as a linear function of the turning rate by conventional means 46, as explained above, so that the voltage picked off by arm 44 is algebraically proportional to the instantaneous angular velocity $\Omega$ of transducer 12. This voltage is applied across resistor 56 of potentiometer 54. Arm 58 of potentiometer 54 rotates at such an angular velocity that it covers its range in T seconds, where T is in the interval between transmitted pulses. Arm 58 passes the grounded end 60 of resistor 56 of potentiometer 54 at the end of each transmitted pulse of acoustic energy. The amplitude of voltage picked off by arm 58 thus tends to vary in the form of a sawtooth, proportional at each instant to the angular velocity with which transducer 12 is turning and to the time that has elapsed since the end of the last transmitted pulse. This voltage is then added to the sum voltage by transformer 48 to produce the output voltage $V_0$.

Obviously many modifications and variations of the present invention are possible in the light of the above teachings. It is therefore to be understood that within the scope of the appended claims the invention may be practiced otherwise than as specifically described.

What is claimed is:

1. In combination, a transmitter and transmitting transducer for projecting acoustic energy in a beam, said beam having an axis, said transmitter and transmitting transducer adapted to continuously produce acoustic energy of a given frequency, a multisegment receiving transducer, the sensitivity pattern of said receiving transducer having an axis which normally substantially coincides with the axis of the transmitting transducer, means for rotating said transducers at like regular velocity to scan an underwater region, a bearing deviation indicator network, means for applying voltages induced in segments of the receiving transducer to said network, said network producing a first voltage which is a function of the vector sum of the applied voltages and a second voltage which is a function of the vector difference of the applied voltages, means for shifting the phase of one of the two voltages by 90°, and circuit means for adding a fraction of the voltage whose phase was shifted 90° to the other of said two voltages to produce an output voltage, the magnitude of said fraction being a function of said angular velocity, whereby the output voltage is substantially the same as though the axis of the receiving transducer lags the axis of the transmitting transducer by an angle determined by their angular velocity.

2. In combination, a transmitter and transmitting transducer for projecting acoustic energy, said transmitter and transmitting transducer adapted to continuously produce acoustic energy of a given frequency, a multi-segment receiving transducer, the sensitivity patterns of said transmitting and receiving transducers having axes which are normally substantially coincident, means for rotating said tranducers at like angular velocity to scan an underwater region, a bearing deviation indicator network, means for applying voltages induced in segments of the receiving transducer to said network, said network producing a first voltage which is a function of the vector sum of the applied voltages and a second voltage which is a function of the vector difference of the applied voltages, means for shifting the phase of one of the two voltages by 90°, and circuit means for adding a fraction of the voltage whose phase was shifted 90° to the other of said two voltages to produce an output voltage, the magnitude of said fraction being a function of said angular velocity.

3. In combination, a transmitter and transmitting transducer for projecting acoustic energy in a beam, said beam having an axis, said transmitter and transmitting transducer adapted to continuously produce acoustic energy of a given frequency, a multisegment receiving transducer, the sensitivity pattern of said receiving transducer having an axis which normally substantially coincides with the axis of the transmitting transducer, means for rotating said transducers at like angular velocity to scan an underwater region, a bearing deviation indicator network, means for applying voltages induced in segments of the receiving transducer to said network, said network producing a first voltage which is a function of the vector sum of the applied voltages and a second voltage which is a function of the vector difference of the applied voltages, means for shifting the phase of the difference voltage by 90°, a potentiometer, circuit means for applying the phase shifted difference voltage across the resistor of said potentiometer, means for positioning the arm of said potentiometer as a function of said angular velocity, and means for adding the voltage picked off by the arm of the potentiometer to the sum voltage to produce an output voltage, said output voltage corresponding to the signal which would be received if the axis of the receiving transducer lagged the transmitter transducer axis by an angle determined by their angular velocities.

4. In combination, a transmitter and transmitting transducer for projecting acoustic energy in a beam, said beam having an axis, said transmitting transducer adapted to be periodically energized, a multisegment receiving transducer, the sensitivity pattern of the receiving transducer having an axis which normally substantially coincides with the axis of the transmitting transducer, means for rotating said transducers at like angular velocity to scan an underwater region, a bridge network to which the voltages induced in the segments of said receiving transducer are applied for producing a first voltage which is a function of the vector sum of the applied voltages and a second voltage which is a function of the vector difference of the applied voltages, means for shifting the phase of the difference voltage by 90°, a potentiometer, circuit means for applying the phase shifted voltage across the resistor of said potentiometer, the resistor of said potentiometer being center tapped and the center tap being grounded, the position of the arm of the potentiometer being a function of the angular velocity of said transducers, and means for adding the voltage picked off by the arm of said potentiometer and the sum voltage to produce an output voltage.

5. In combination, a transmitter and transmitter transducer for projecting acoustic energy in a beam, said beam having an axis, said transmitting transducer adapted to be periodically energized to produce acoustic energy in pulses, a multisegment receiving transducer, the sensitivity pattern of the receiving transducer having an axis which normally substantially coincides with the axis of the transmitting transducer, means for rotating said transducers at like angular velocity to scan an underwater region, a bridge network to which the voltages induced in the segments of said transducer are applied for producing a first voltage which is a function of the vector sum of the applied voltages and a second voltage which is a function of the vector difference of the applied voltages, means for shifting the phase of the second voltage by 90°, a first potentiometer, circuit means for applying the phase shifted voltage across the resistor of the first potentiometer, the resistor of the first potentiometer being center tapped, the center tap being grounded, means for positioning the arm of the first potentiometer as a function of the angular velocity of the transducers, a second potentiometer, circuit means for applying the voltage picked off by the arm of the first potentiometer to one terminal of the resistor of the second potentiometer, the other terminal of the resistor of the second potentiometer being grounded, the arm of the second potentiometer adapted to be rotated at substantially constant speed and to complete one revolution during the interval between transmitted pulses, the arm of the second potentiometer adapted to contact the grounded terminal of the resistor at the moment the transmitter transducer ceases producing acoustic energy, and means for adding the voltage picked off by the arm of the second potentiometer in series with the sum voltage to produce an output voltage, said output voltage corresponding to the signal which would be received if the axis of the receiving transducer lagged behind the axis of the transmitting transducer by an angle that is a function of said angular velocity and the time that has elapsed since the last pulse of acoustic energy was transmitted.

6. In combination, an active-acoustic underwater target detection system having means including a transmitting transducer for projecting acoustic energy in a directive pattern extending along a reference axis, means including a segmented receiving transducer having a directive detection pattern extending along an acoustic axis parallel to said reference axis and operating to convert resultant target-reflected acoustic energy to target signals differing in phase in accordance with target direction relative to said acoustic axis at the instant of detection, means for rotating said transducers in unison to effect scanning of an underwater region by said patterns, means for deriving a sum signal and a difference signal corrseponding, respectively, to vectorial addition and subtraction of said target signals, and means for combining said sum and difference signals to provide a resultant signal corresponding to the sum signal which would be obtained in accordance with said directive detection pattern trailing said reference axis by an angle serving to compensate for misalignment of said acoustic axis and target direction associated with transducer rotation rate and with transit time of said acoustic energy for a preselected target range.

7. A pulsed active-acoustic underwater target detection system having, in combination: transmitting means including a transmitting transducer for projecting a pulse of acoustic energy at repetitive reference instants and in a directive pattern extending along a reference axis; receiving means including a segmented receiving transducer for detecting target-reflected acoustic energy at corresponding reception instants, said receiving transducer having a directive detection pattern extending along an acoustic axis, and said receiving means operating to convert resultant target-reflected energy to a pair of signals differing in phase substantially in accordance with target direction relative to said acoustic axis at said reception instants; means for rotating said transducers at like angular velocity to effect scanning of an underwater region by said patterns; means for combining said pair of signals to provide a sum signal and a difference signal corresponding, respectively, to vectorial addition and subtraction of said pair of signals; and means for modifying and combining said sum and difference signals to provide a resultant signal substantially corresponding to that which would be obtained by trailing said acoustic axis relative to said reference axis to position said receiving transducer pattern in substantial alignment with the direction of the target at the time reflected acoustic energy is received therefrom; said last mentioned means comprising a phase-shifter to convert said difference signal to one which is in-phase with said sum signal, and means for varying the magnitude of said difference signal as a direct function of said angular velocity and of the time interval between corresponding reference and reception instants.

References Cited in the file of this patent

UNITED STATES PATENTS

| | | |
|---|---|---|
| 2,688,744 | Sunstein | Sept. 4, 1954 |
| 2,702,379 | Barton | Feb. 15, 1955 |